(12) United States Patent
Yao et al.

(10) Patent No.: US 8,571,311 B2
(45) Date of Patent: Oct. 29, 2013

(54) RASTER GRAPHICS IMAGE TRANSCODING FOR FILE SIZE REDUCTION

(75) Inventors: Yisheng Yao, Sammamish, WA (US); Ke-Cheng Huang, Sammamish, WA (US); Emmanuel Papirakis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 130 days.

(21) Appl. No.: 13/327,537

(22) Filed: Dec. 15, 2011

(65) Prior Publication Data

US 2013/0156309 A1 Jun. 20, 2013

(51) Int. Cl.
*G06K 9/36* (2006.01)

(52) U.S. Cl.
USPC ........................................ 382/166

(58) Field of Classification Search
USPC .......... 382/162–167; 345/589–604, 420, 424; 358/1.9, 518, 3.23
See application file for complete search history.

(56) References Cited

U.S. PATENT DOCUMENTS

| | | | |
|---|---|---|---|
| 5,949,428 A * | 9/1999 | Toelle et al. | 345/589 |
| 6,556,199 B1 * | 4/2003 | Fang et al. | 345/424 |
| 7,242,401 B2 * | 7/2007 | Yang et al. | 345/420 |
| 7,525,552 B2 | 4/2009 | Yang et al. | |
| 7,991,238 B2 | 8/2011 | Malvar et al. | |
| 8,107,724 B2 * | 1/2012 | Descarries | 382/162 |
| 8,379,044 B2 * | 2/2013 | Yang et al. | 345/589 |
| 2010/0027877 A1 | 2/2010 | Descarries | |

OTHER PUBLICATIONS

Bloomberg, Dan S., "Color Quantization using Octrees", Published on: Sep. 4, 2011, Available at: http://citeseerx.ist.psu.edu/viewdoc/download?doi=10.1.1.131.301&rep=rep1&type=pdf.
Robinson, John A., "Adaptive Prediction Trees for Image Compression", In Proceedings of Transactions on Image Processing, IEEE, vol. 15, Issue No. 8, Aug. 2006, pp. 2131-2145.
Periasamy, et al., "A Common Palette Creation Algorithm for Multiple Images with Transparency Information", In Proceedings of International Conference on Advances in Computing, Control, and Telecommunication Technologies, IEEE, Dec. 28-29, 2009, pp. 359-363.
"Color Quantization using Octrees", Retrieved on: Oct. 3, 2011, Available at: http://drdobbs.com/article/print?articleId=184409805&siteSectionName=.
Periasamy, et al., "Common Palette Creation Algorithm for Alpha and sRGB Images", In proceedings of International Journal of Computer Applications (0975-8887), vol. 1, Issue No. 29, 2010, pp. 23-30.
Memon, et al., "Transcoding GIF Images to JPEG-LS", In proceedings of Transactions on Consumer Electronics, IEEE, Aug. 1997,vol. 43, Issue:3, pp. 423-429.

* cited by examiner

*Primary Examiner* — Ishrat I Sherali
(74) *Attorney, Agent, or Firm* — Gonzalez Saggio & Harlan LLP (57) ABSTRACT

Described is a technology by which a raster graphics image file (e.g., a PNG) containing pixels having color component data and alpha channel data (e.g., RGBA data) is transcoded into a smaller Palette Indexed format with non-noticeable and/or virtually no loss. Hextrees are used to represent the pixels of the image, such as one hextree for each subset (segment) of the image's pixels, where alpha channel data distribution may be used to determine each segment. A palette containing sets of alpha and color values is generated from the hextrees, with the transcoded image data provided by representing the pixel data as indexes to the palette.

20 Claims, 5 Drawing Sheets

RASTER GRAPHICS IMAGE TRANSCODING FOR FILE SIZE REDUCTION

BACKGROUND

Raster graphics (or bitmap) images, such as Portable Network Graphics (PNG) files and Graphics Interchange Format (GIF) files, generated by most image-related programs are not transcoded particularly efficiently. For example, a significant percentage of PNG files are transcoded using Rgb24 or Rgba32 pixel formats, for which each pixel requires three or four bytes, respectively.

Thus, conventionally encoded raster images are somewhat inefficient with respect to transferring them over a network. As images become pervasive on the Internet, any efficiency improvement in the file size reduction of raster graphics is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a raster image (e.g., a PNG file) containing pixels having color component data and alpha channel data (e.g., RGBA data) is transcoded into a new but smaller raster image. The pixels of the image are represented within one or more hextrees, and node reduction is performed on the one or more hextrees to obtain a specified number of remaining nodes for each hextree. A palette is generated from the remaining nodes, with which the pixel color values are represented as their indexes in palette.

In one aspect, the image may be segmented into a plurality of segments, with the pixels of each segment represented within one hextree for that segment. Alpha channel data distribution may be used to determine each segment.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards transcoding color and transparency data (also referred to opacity data, represented by alpha channel values) via data structures referred to as hextrees. The transcoding operation may include segmenting the image based upon alpha channel distribution, with a hextree for each segment providing a plurality of hextrees that are used as part of the transcoding process.

It should be understood that any of the examples herein are non-limiting. For example, octree and hextree data structures are described herein, however other data structures (e.g., larger ones that are not necessarily filled with data) may be equivalently used. Further, PNG image files are described as one example raster graphics file format, however any other raster graphics file format containing RGB or RGBA colors may benefit from the technology described herein, as can images represented in other component color schemes such as CMYK. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image encoding in general.

Figure 1:
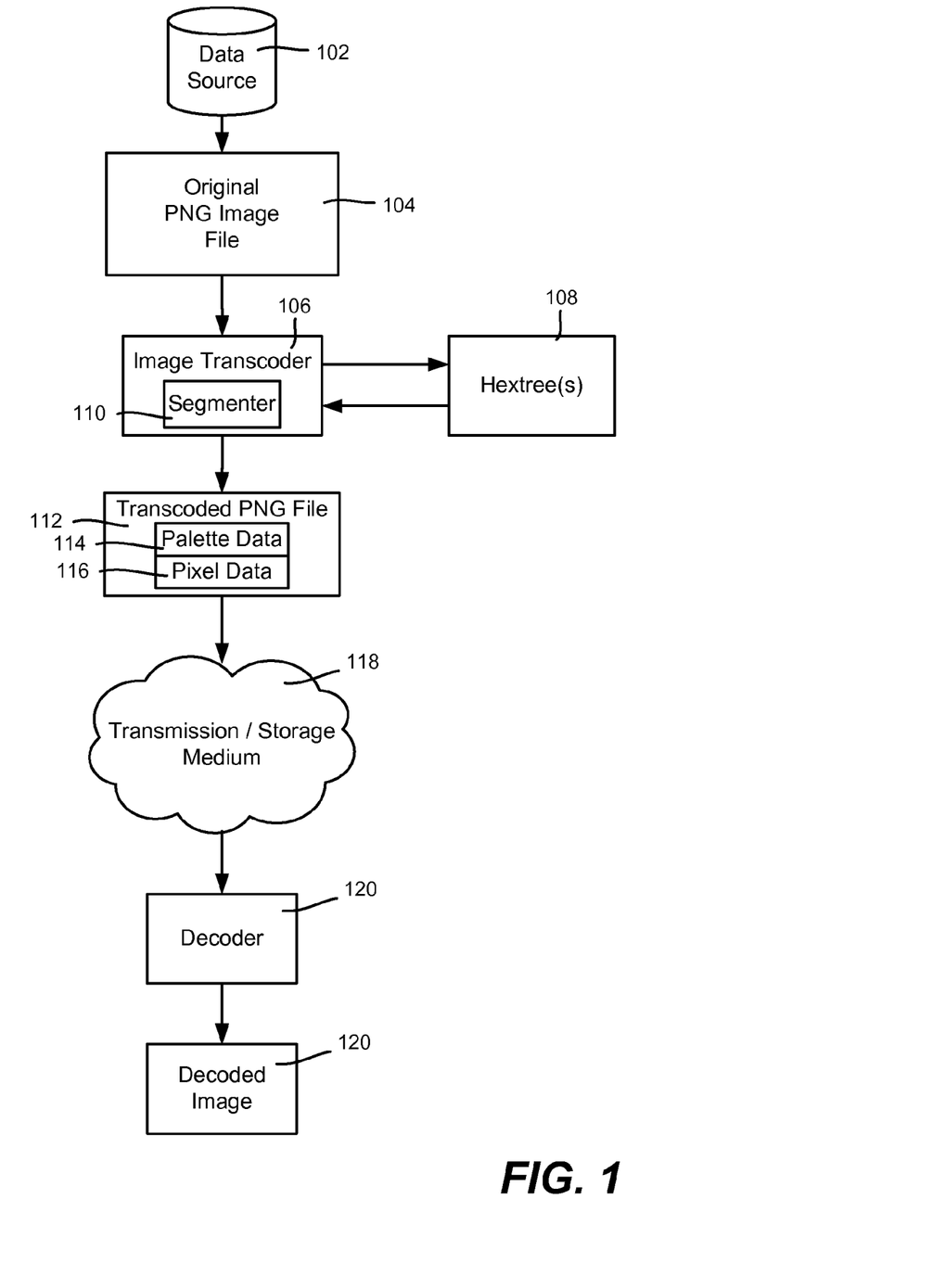
FIG. 1 is a block diagram showing example components of a system that transcodes image files according to one example implementation for PNG files.

FIG. 1 shows a block diagram comprising an example system for PNG file size reduction, such as for more efficient network transferring and/or storage. In general, a data source 102 such as a website provides an original PNG image file 104, which may be transcoded by Image Transcoder 106 as described herein. Note that a configurable threshold value may be set on image file size, to avoid processing where savings from the transcoding is not sufficiently significant. For example, images less than one-kilobyte in size may not be transcoded.

The input images are processed by the Image Transcoder 106 as described herein. In one implementation, the Image Transcoder operates to transcode images containing alpha channel data by the use of one or more data structures referred to as hextrees 108. Further, a segmenter 110 may segment the image into segments, with each segment corresponding to a hextree. For images that do not include alpha channel data, octree-based formatting as also described herein may be used.

The transcoding result is a smaller PNG file 112 comprising palette data 114 (or more simply the "palette") and pixel data 116 comprising an index to the palette data for each pixel. As will be understood, the palette comprises RGB values for a PNG image without alpha channel data, or RGBA values for an image with alpha channel data. Note that other image formats and component color schemes may result in a similar palette, index values file. A typical palette represents 256 RGB colors (768 bytes), or alpha channel data plus 256 RGB colors (one kilobyte).

At this time, the transcoded image file 112 may be transmitted and/or stored over/in a suitable medium (or media) 118. When received/accessed from storage, the file 112 may be viewed in a straightforward way via a decoder 120 that substitutes the RGB or RGBA values from the palette as indexed at each pixel position to obtain the decoded image 122 that is displayed.

To transcode PNG files into a palette-indexed format with acceptable loss, a color reduction algorithm is used to quantize the colors. One well-known color reduction algorithm for non-alpha channel images is described in "*Octree Color Quantization,*" Nils Pipenbrinck, http://www.cubic.org/docs/octree.htm (1998).

In general, the octree algorithm builds an octree from the image, comprising a tree data structure, in which each node may have up to eight children. The algorithm takes the RGB (or other component color scheme) pixel values of a PNG image or the like as input to build an octree of eight levels. In the octree, each of the leaf nodes contains three sums (one for each of the three color components R, G, B) and the pixel count of that node. When adding a pixel into the octree, based on the color value, the algorithm finds a path to a leaf node, updates the three color component sums, and increments the pixel count.

To find the path from the root to the appropriate leaf node, the index of the child node to locate (represented by three bits), is determined by the value of the same bit from R, G, and B of the input color, where the bit position corresponds to the level number. For example, the color [193, 24, 33] represented in binary [11000001, 00011000, 00100001] has as its highest bits 1, 0, 0, which equals four decimal; thus the corresponding level's fourth node is located and updated for this color. The nodes for other levels, corresponding to lesser and lesser significant bits, are determined in the same way. Such an octree has an upper memory bound, because the maximal number of nodes is: $8^0+8^1+8^2+\ldots+8^7=2,396,745$.

After processing the pixel colors into the octree, a color palette may be built from the octree by using color/node reduction. To reduce the number of nodes to some specified value, which corresponds to the size of the color palette, the leaf node with the minimal pixel count (i.e., the least important one) is found, the pixel count merged with its parent pixel count, and each color component summed to its parent node's sum. The node is then removed. This process is repeated by looping back to determine the leaf node with what is now the minimal pixel count (after removal of the previously found minimal one), then merging and summing, and so on until the number of leaf nodes is equal or less than the specified value.

To build the palette, palette values are calculated as the averages of the RGB components (sum divided by pixel count) of each of the leaf nodes in the reduced octree. The palette index value for each leaf node is saved to that leaf node.

With respect to bitmap reconstruction, after color reduction, the image is reconstructed with the indexed colors. If the pixel Rgba32 color's A (alpha, or opacity) component is not zero (0), then reconstruction finds the palette index for this color. Otherwise, the palette index for the transparent black color is used. As a result, octree color reduction basically loses alpha channel information. If the original image contains transparent pixels, an octree is not sufficient to handle them.

Figure 2:
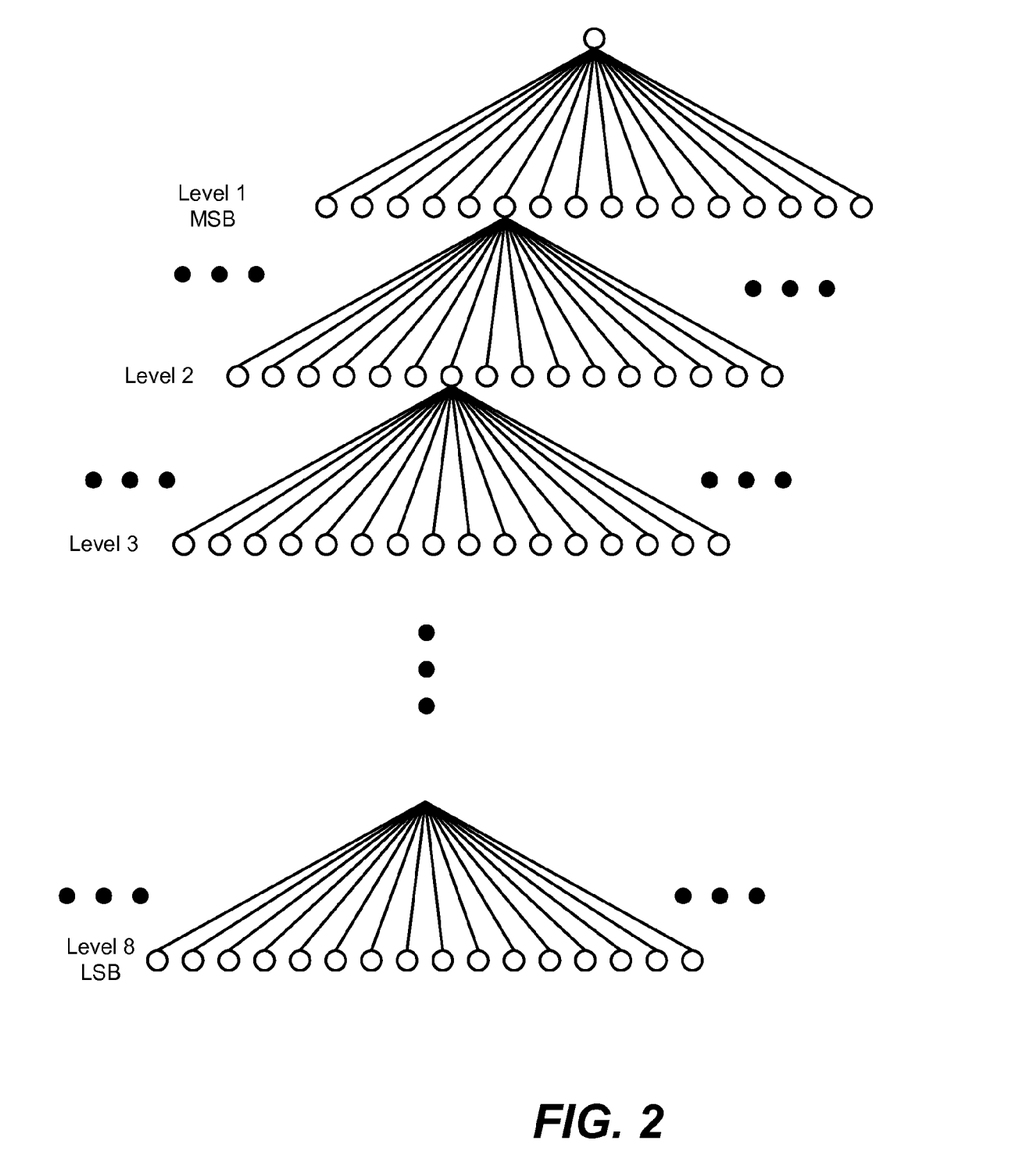
FIG. 2 is a representation of a hextree used in transcoding a raster image file containing alpha channel (e.g., transparency) information.

Described herein is the use of a hextree data structure for quantizing image data including images with alpha channel information. Like the octree, the hextree has at most eight levels (for the eight bits used for each color or alpha channel data), however as represented in FIG. 2, each node of the hextree may have at most sixteen child nodes (instead of eight nodes as with octrees).

To quantize raster images having transparency data such that (unlike the octree-based color quantization algorithm) the alpha channel information after transcoding is not lost, the alpha channel for each of the palette colors is set such that the resultant image has appropriate transparency across the image surface. To this end, the child node index is determined by the level-specific bit of the Alpha, Red, Green, and Blue component of the color. For example, a pixel with Alpha/RGB color decimal values of [200, 93, 24, 33] represented in binary [11001000, 11000001, 00011000, 00100001] has as its highest bits 1, 1, 0, 0, which equals twelve decimal. The twelfth node at the corresponding level may be located using the same scheme as for octrees, repeating for each less significant bit, and each other pixel until the pixels are fully represented in the hextree.

During node reduction, the alpha sum value is added to the parent's alpha sum. Then the alpha value in the palette is the alpha sum of the leaf node divided by the total references of the node. R, G and B sums are similarly processed.

While this provides significant improvements in perceived image quality in many instances, adding the alpha channel in the hextree may cause the alpha value in the palette to be less desirable for some other pixels, whereby the transcoding result for the hextree may noticeably skew such images.

Described herein is a mechanism that solves this problem by segmenting the pixels of the raster image into multiple segments based on the alpha channel distribution. Each segment corresponds to a separate hextree from which a sub-palette is obtained as generally described above, corresponding to a subset of the image's pixels. To this end, the distribution of pixels is calculated by alpha values, with the image pixels divided into multiple segments; (the number of segments is configurable, and a suitable default value is four segments). Note that in general each segment results in a sub-palette of the same size, however it is feasible to have different sized sub-palettes by reducing each hextree to a specified number of nodes that is not necessarily the same for each hextree.

By way of a simplified example of segmentation, consider that an image, including alpha data, of 1,000 pixels is to be reduced, and eight segments are to be used. Thus, a desirable distribution based upon alpha counts is to have a segment for approximately every 125 alpha counts (1000/8=125).

Figure 3:
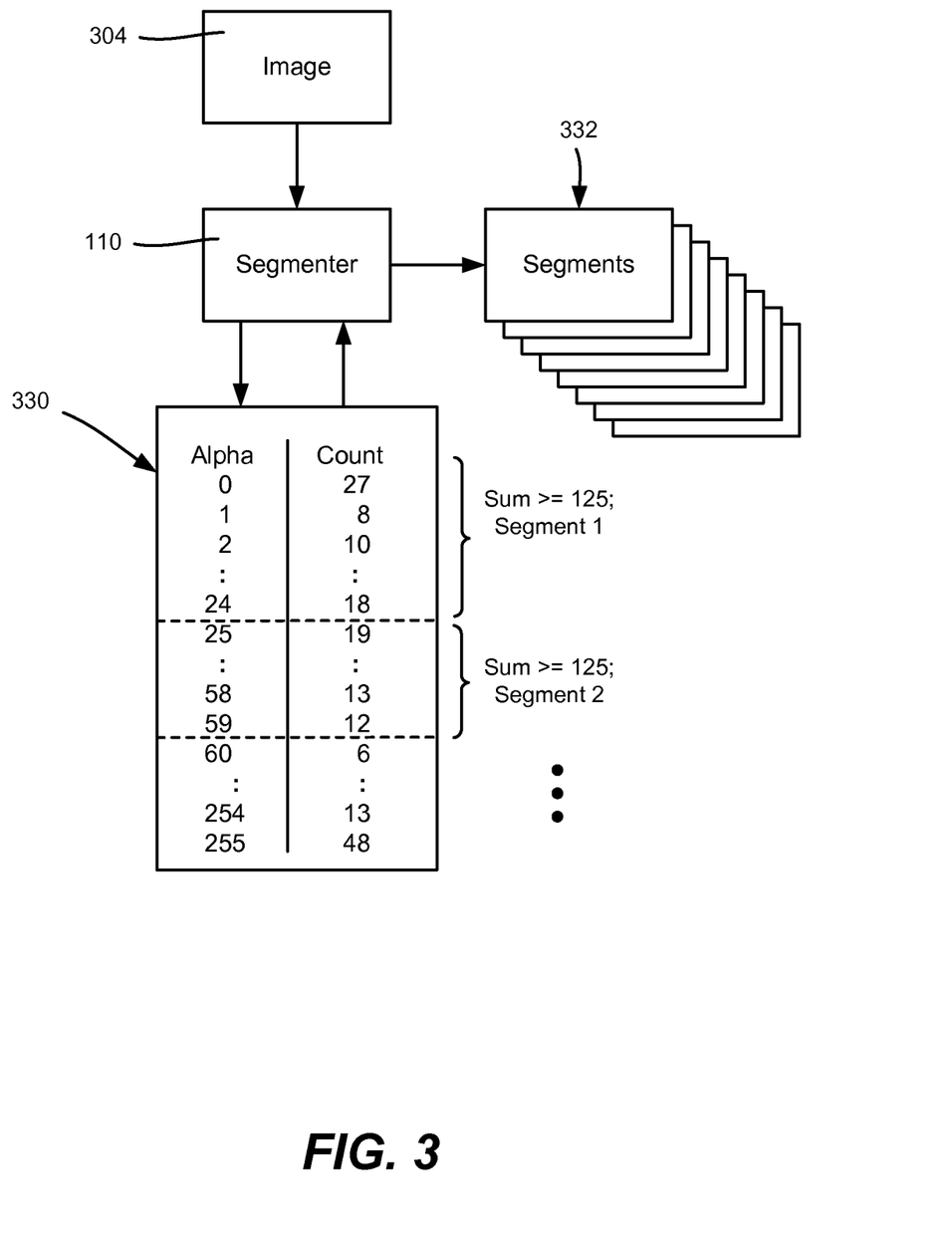
FIG. 3 is a block diagram showing a representation of segmenting the pixel data of a raster image file based upon alpha channel distribution in order to transcode a raster image file containing alpha channel information.

Using the above example, FIG. 3 shows how segmenting may be accomplished in one implementation. In general, for each pixel's alpha value, an alpha count for that value is incremented (e.g., by the segmenter 110 of FIG. 1) in a table 330. As can be seen in the example table 330 of FIG. 3, an image 304 being transcoded has twenty-seven pixels with an alpha value of zero, eight pixels with an alpha value of one, ten pixels with an alpha value of two, and so on.

When the counts are complete in the table 330, the segmenter 110 separates the image's pixels into a set of segments 332 based upon an approximately equal distribution of the alpha counts. One way this may be accomplished is to sum the counts from the start of each segment until the desired distribution value is achieved, which in this example was 125 alpha counts (1000/8=125). Other ways such as to segment based upon being within a plus or minus range of the desired distribution value, even if less than the desired distribution value, are feasible. The way the counts are distributed may also determine the number of segments in use; for example, an iterative process to find what total number of segments (such as between four and ten) has the most even distribution may be used to establish the number of segments to use, and then determine the segments.

In the example of FIG. 3, based upon their sums achieving (upon equaling or exceeding) the desired distribution value of 125, the pixels with alpha values of zero to twenty-four (0-24) are placed in one segment, pixels from twenty-five to fifty-nine (25-59) in another segment, and so on. Note that in this example it is possible that there may be less than eight segments, and/or that the last segment has relatively few counts therein, however this segmenting technique still works well in practice. Further, if desired, it is straightforward for the segmenting mechanism to do additional processing to wind up with the initially desired number of segments and/or balance the distributions therein somewhat more closely.

For each segment, a hextree is created, with color reduction individually performed on each hextree. For example, if eight segments exist, and the specified value for the size of the color palette is two-hundred fifty six colors, then each segment's resulting sub-palette indexes thirty-two colors. When combined (e.g., appended to one another), the resulting eight sub-palettes are the same size as a palette for the image had it not been segmented, however in general the quality of the image when decoded is more accurate with respect to transparency.

A quality checking mechanism, such as generally described in copending U.S. patent application "Dynamic Image Quality Checker" may be used to verify that the quality of the transcoded image is acceptable. For example, the peak signal-to-noise ratio (PSNR, a well-known image quality metric) of the transcoded image may be checked against the original image. If the PSNR is in the acceptable range (psnrLowCap, psnrHighCap, which are configurable values), then the transcoded result is accepted. If the PSNR is higher than the psnrHighCap, more colors may be reduced until the PSNR drops to the acceptable range. If PSNR is too low, then the transcoded result is discarded, restoring the previous acceptable one or the original one. Other image quality measures, such as structural similarity (SSIM) index, may be used in a similar way as well.

Figure 4:
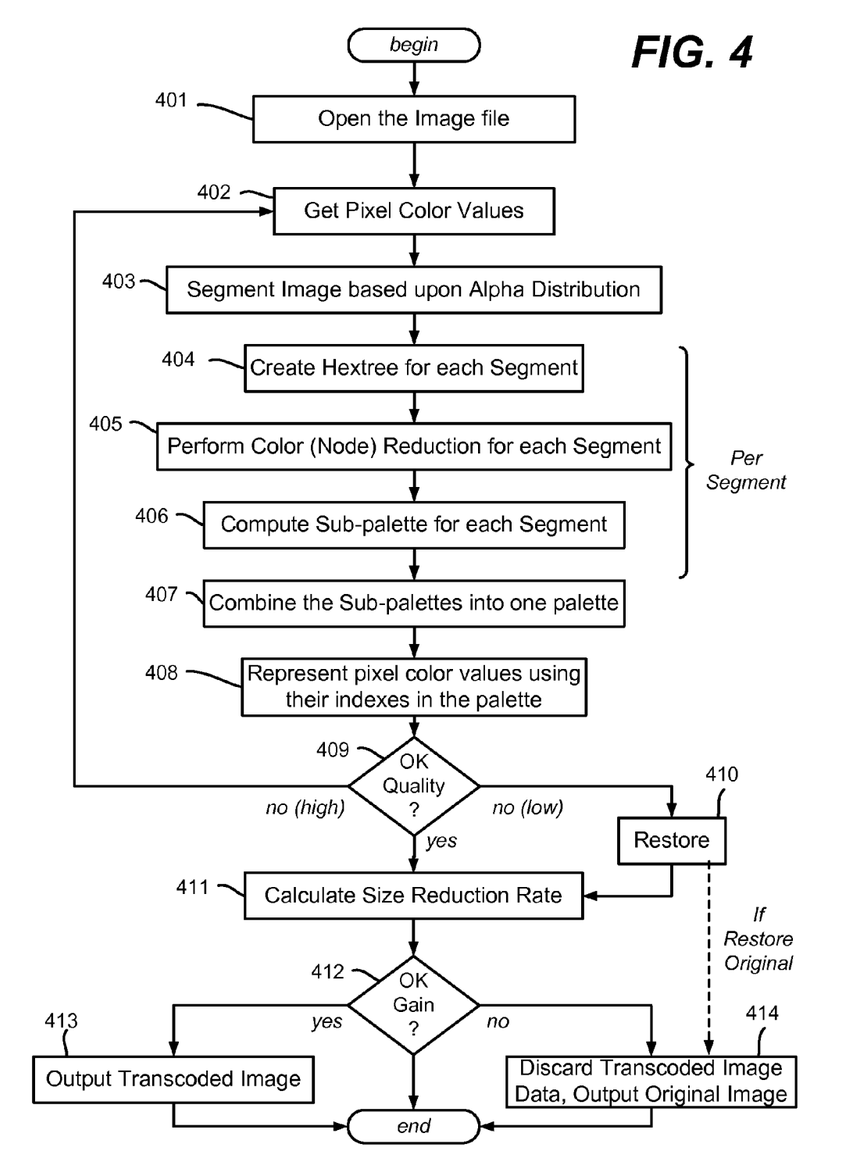
FIG. 4 is a flow diagram representing example steps that may be taken to transcode a raster image file containing alpha channel information.

By way of summary of image transcoding as described herein, a transcoding algorithm may initially distinguish between images without alpha channel data and with alpha channel data; images without alpha channel data may be transcoded using octree-based transcoding, while images with alpha channel data may be transcoded using hextree-based transcoding, including via segmenting the image. One example overall PNG transcoding process for an image with alpha channel data (along with RGB data) to be transcoded includes the following steps, generally represented in the flow diagram of FIG. 4:

401) Open the image file (e.g., in a memory stream)
402) Get the pixel color values from original image
403) Perform segmenting
404) Create a hextree for each segment
405) Perform color reduction for each segment
406) Compute the sub-palette for each segment
407) Combine the Sub-palettes into one palette.
408) Represent pixel color values using their indexes in the palette
409) Apply the QualityChecker algorithm; if too high, reduce more colors if necessary by repeating at least some of steps 402 to 407; if too low, restore (step 410) to previous one or the original
411) Calculate the SizeReductionRate
412) If the SizeReductionRate is greater than the Gain Threshold, then output (step 413) the content of the memory stream as the transcoded resource content. Otherwise discard the reconstructed image and return (step 414) the original input.

The algorithm also may handle any known exceptions that may happen in transcoding, such as FileFormatException, NotSupportedException, ArgumentException, OutOfMemoryException, and so forth, such as by returning the original content.

Experimental results show that most PNGs and GIFs on the Internet can be suitably transcoded into a Palette Indexed format with non-noticeable and/or virtually no loss. On average, approximately fifty percent of PNG file size may be saved.

Example Operating Environment

Figure 5:
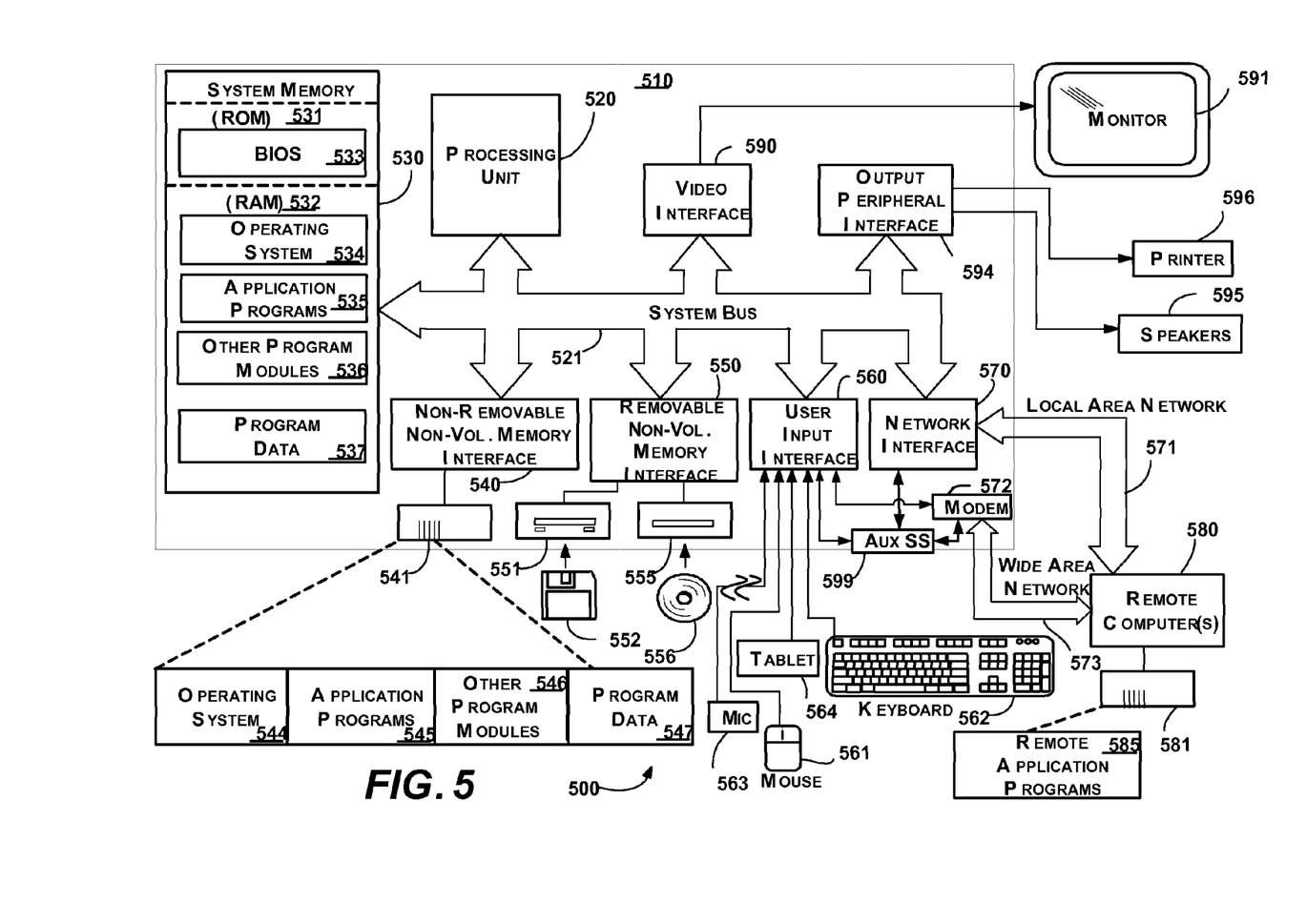
FIG. 5 is a block diagram representing an example computing environment into which aspects of the subject matter described herein may be incorporated.

FIG. 5 illustrates an example of a suitable computing and networking environment 500 into which the examples and implementations of any of FIGS. 1-4 may be implemented, for example. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the example operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an example system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are examples and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising, transcoding an image containing pixels having color component data and alpha channel data, including representing the pixels of the image within one or more hextrees, performing node reduction on the one or more hextrees to obtain a specified number of remaining nodes for each hextree, generating a palette from the remaining nodes of the one or more hextrees, and providing transcoded image data, including representing at least some of the pixel data as indexes to the palette.

2. The method of claim 1 wherein representing the pixels of the image within one or more hextrees comprises segmenting the image into a plurality of segments, and representing the pixels of each segment within one hextree for that segment.

3. The method of claim 2 wherein segmenting the image into the plurality of segments comprises using alpha channel data distribution to determine each segment.

4. The method of claim 3 wherein using alpha channel data distribution to determine each segment comprises segmenting based upon alpha value counts, including for each alpha value, counting occurrences of that alpha value in the image.

5. The method of claim 1 wherein transcoding the image comprises transcoding a Portable Network Graphics (PNG) image file or a Graphics Interchange Format image file into a transcoded image file.

6. The method of claim 1 further comprising, arranging the transcoded image data into a file, and transmitting the file over a network.

7. The method of claim 1 further comprising, reconstructing a reconstructed image based at least in part upon the transcoded image data, determining whether a quality measure of the reconstructed image meets a quality threshold, and if not, discarding the transcoded image data.

8. The method of claim 1 further comprising, reconstructing a reconstructed image based at least in part upon the palette and the indexes, determining whether the quality of the reconstructed image meets a quality threshold, and if not, performing further node reduction to obtain a new set of transcoded image data.

9. The method of claim 1 further comprising, reconstructing a reconstructed image based at least in part upon the palette and the indexes, determining whether a size reduction measure of the reconstructed image meets a gain threshold, and if not, discarding the transcoded image data.

10. A system comprising, a transcoder configured to transcode an input image containing pixels having color component data and alpha channel data into a transcoded image file, the transcoder configured to segment the image into a plurality of segments, represent the color component data and the alpha channel data of the pixels of each segment within a hextree for that segment, process each hextree into a sub-palette, and represent the pixels of the image as an index into one of the sub-palettes.

11. The system of claim 10 wherein the transcoder segments the image into the plurality of segments based upon alpha channel data distribution.

12. The system of claim 10 wherein the input image comprises a Portable Network Graphics (PNG) image or a Graphics Interchange Format image.

13. The system of claim 10 wherein the color component data of the input image comprises red, green, blue (RGB) values for each pixel.

14. The system of claim 10 wherein the sub-palettes are combined into a palette in the transcoded image file.

15. The system of claim 10 wherein the sub-palettes are combined into a palette representing the set of alpha value, RGB values in the transcoded image file.

16. The system of claim 10 further comprising, a quality evaluation mechanism that determines whether to use the transcoded image file based on a quality measure thereof.

17. The system of claim 10 further comprising, a gain evaluation mechanism that determines whether to use the transcoded image file based on a size reduction of the transcoded image file relative to the input image file.

18. One or more computer storage media having computer-executable instructions, which when executed perform steps, comprising:
  segmenting subsets of an input image's red, green, blue, alpha (RGBA) pixels into segments;
  representing each of the segments as a hextree;
  processing each hextree into a sub-palette; and
  encoding the input image into a transcoded image file comprising the sub-palettes and an index reference for each pixel to an entry in one of the sub-palettes.

19. The one or more computer storage media of claim 18 wherein segmenting the subsets comprises determining the subsets based upon alpha data distribution.

20. The one or more computer storage media of claim 18 wherein processing each hextree into a sub-palette comprises performing node reduction, including combining alpha information of a child node with alpha information of a parent node.

* * * * *